May 13, 1941.                L. F. ATHY ET AL                2,242,161
                        METHOD OF LOGGING DRILL HOLES
                    Filed May 2, 1938            2 Sheets-Sheet 1

INVENTORS
Lawrence F. Athy,
Harold R. Prescott
BY
ATTORNEY

May 13, 1941.  L. F. ATHY ET AL  2,242,161
METHOD OF LOGGING DRILL HOLES
Filed May 2, 1938  2 Sheets-Sheet 2

INVENTORS
Lawrence F. Athy
Harold R. Prescott
BY
ATTORNEY

Patented May 13, 1941

2,242,161

UNITED STATES PATENT OFFICE 2,242,161

METHOD OF LOGGING DRILL HOLES

Lawrence F. Athy and Harold R. Prescott, Ponca City, Okla., assignors to Continental Oil Company, Ponca City, Okla., a corporation of Delaware Application May 2, 1938, Serial No. 205,554

3 Claims. (Cl. 73—51)

Our invention relates to a method of logging drill holes and more particularly to a method of logging and correlating bore holes by means of temperature.

It is of great geological and economic importance in seeking petroleum and other mineral deposits, to be able to determine the relative elevation and structure of subsurface formations encountered in bore holes. Such structural data may be obtained by correlating characteristics of formations pierced by a drill during drilling.

In the prior art, a record or log is kept during core drilling, showing the different formations traversed. This is a tedious operation and sometimes inaccuracies result, due to the difficulty of ascertaining exactly where one stratum has been left off and another has been entered.

Where a drill hole is already in existence, it is frequently desirable to check the thickness of various strata. Frequently, valuable geological information may be obtained by correlating a plurality of spaced drill holes and for this work accurate knowledge of the depth and thickness of the different layers is essential.

One object of our invention is to provide a rapid, inexpensive and dependable method of logging drill holes.

Other and further objects of our invention will appear from the following description.

In the accompanying drawings which form part of the instant specification and are to be read in conjunction therewith;

Figures 1, 2:
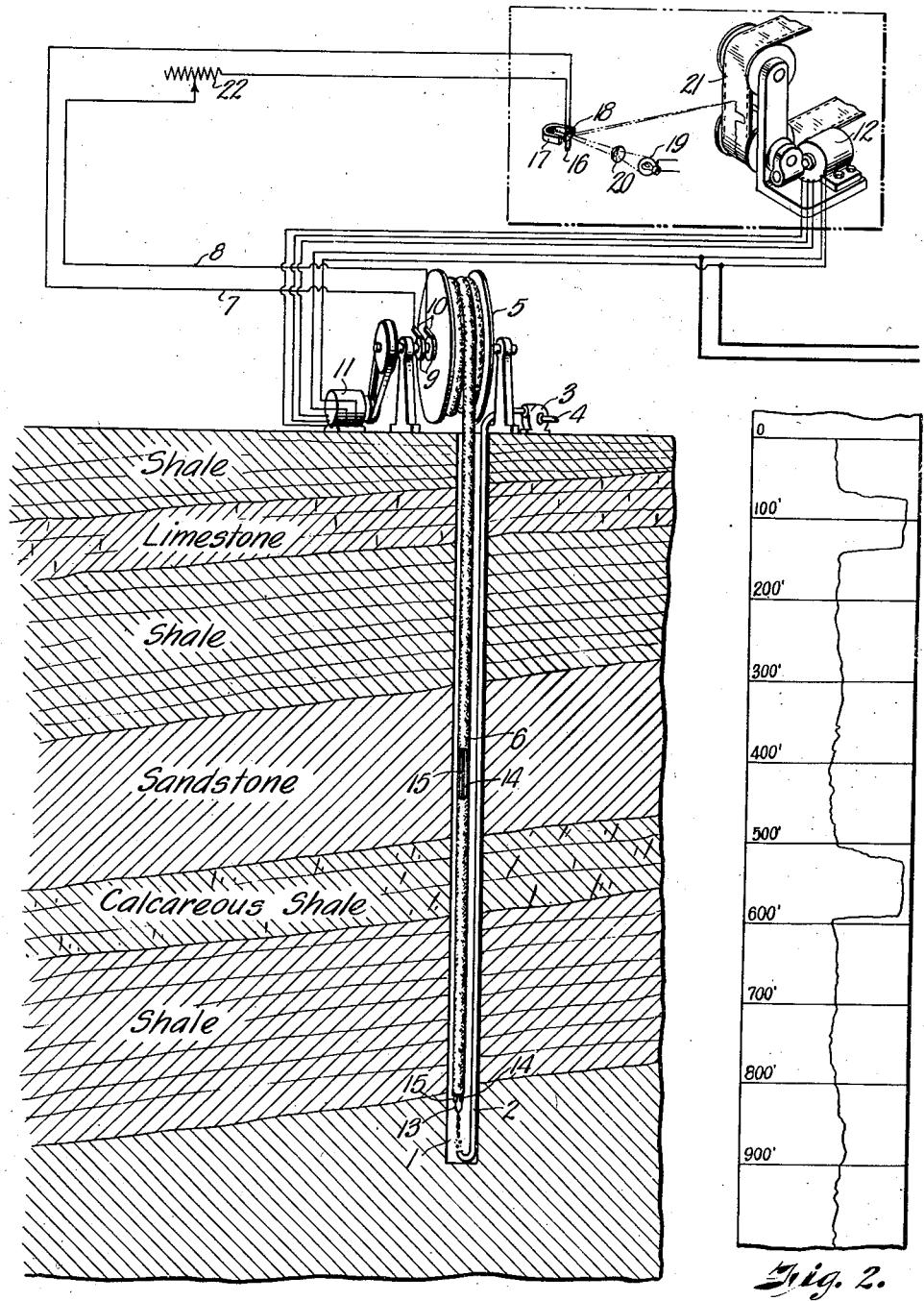
Figure 1 is a diagrammatic view of a drill hole, equipped with apparatus of our invention and capable of carrying out the method of our invention.
Figure 2 is a view of a bore hole log taken according to the method of our invention.

In general, our invention contemplates the introduction into a drill hole of an agent capable of chemically reacting with the materials comprising the walls of the hole, and recording the temperature differences at points along the drill hole, which temperatures are the result of the reaction between the chemicals introduced and the materials of the drill hole.

Referring now to the drawings, the drill hole 1 which is to be logged, extends through a plurality of layers of different rock. The drill hole 1 is first properly conditioned by washing it with clear water to remove drilling mud, sediment, and the like. The washing is accomplished by pumping water through pipe 2, by means of pump 3. After the hole has been washed, the pipe 4 through which the pump 3 takes suction, is supplied with a chemical reactant such as dilute hydrochloric acid, dilute sulphuric acid or the like. It is to be understood, of course, that any suitable reagent capable of chemically reacting with the rock material of the bore hole may be employed. The amount of acid and its hydrogen ion concentration is not critical and may be varied over rather wide limits depending on the composition of the drilling fluid. It is desirable, however, that the same hydrogen ion concentration be used in exploring a plurality of holes so that the respective logs made may be correlated.

It may be advisable to introduce the acid into the hole in an inhibited state and then to use an activating agent to establish an acid condition. Such is considered within the scope of our invention.

If desired, an acid anhydrde may be introduced into the hole and later activated by means of steam or water.

As soon as the fluid in drill hole 1 becomes sufficiently acidic, the dilute acid will react with some or all of the various minerals and chemical compounds constituting the strata of the walls of the hole. If the chemicals be such that the action is exothermic, heat will be generated, the amount depending upon the proportion of the various reactants in the layers being reacted upon. For example, if acid is used, the limestone and calcareous formations will be actively attacked by the acid solution and opposite such formations, the fluid temperature will be notably increased. Opposite preponderate siliceous layers, the reaction will not be extensive or violent and the temperature of the fluid in the bore hole in the vicinity of these layers will be noticeably less.

According to our method, we lower a temperature responsive device into the hole and record the fluid temperatures observed throughout the entire depth of a hole. A record of the fluid temperatures will give an index of the character of the materials in the walls of the hole. A plurality of such temperature logs obtained from a plurality of holes positioned over an area will provide means for correlating the various stratigraphic horizons by reason of their characteristic reaction to a given chemical treatment.

For measuring and recording the temperature, we provide a reel 5 upon which is housed an electric cable 6, the ends of which are electrically connected to conductors 7 and 8 by means of slip rings 9 and brushes 10. The reel 5 is rotated for raising and lowering the electric cable 6 by means of a synchronous motor 11, synchronously connected to an electric motor 12. A thermocouple 13 is connected to the conductors of the cable 6. A thermocouple may be formed integrally with the cable by providing a pair of conductors therein of dissimilar metals such as copper and iron, having their ends fused together at the lower end to form a thermocouple. Conductor 14, for example, may be iron and conductor 15 of the cable 6 may be copper. As various temperatures are encountered by the thermocouple, various voltages are generated therein. These voltages may be impressed either through an amplifying system or directly upon oscillograph element 16. The oscillograph element 16 is positioned in the field of the permanent magnet 17 and carries a mirror 18 upon which is focused light from an incandescent lamp 19, by means of lens 20 for reflection upon a sensitized record strip 21. A variable resistance 22 may be placed in one of the conductors 8 for governing the amplitude of the oscillograph trace. The motor 12 is geared to move the record strip 21. It will be obvious that since motors 11 and 12 are synchronously connected that movement of the thermocouple near the hole will result in a movement of the record strip which is a function of the movement of the thermocouple.

Figure 2 shows a record strip taken in the formation depicted in Figure 1. The depth scale is indicated vertically in feet and the temperature horizontally in degrees. It will be noted that opposite the upper limestone bed, a rising temperature was experienced, while opposite the shale and sandstone beds, the temperature remained at a lower point. Another rise of temperature was experienced opposite the layer of calcareous shale containing carbonates adapted to react with the acid.

It will be obvious that the same formation will extend over a considerable area but that the strata will be at various depths, depending on whether the formation dips upwardly or downwardly. An adjacent bore hole some distance removed from bore hole 1 may be similarly treated and another log taken. The two logs may be correlated to show the vertical deviation of identifiable layers. An entire area may be observed by means of a plurality of drill holes and a structure map of the area readily made.

It is to be understood that any suitable reactive chemical may be employed in carrying out the method of our invention. For example, if the siliceous materials are to be attacked, hydrofluoric acid may be employed. Oxidizing agents such as solutions of potassium permanganate, potassium chlorate, or the like, are of utility where one or several layers contain organic material such as peat, lignite, hydrocarbon gas or hydrocarbon oil. Lime and soda solutions may be employed as well as base exchange silicates or zeolites. Where layers are porous, the hole, after washing, may be impregnated with a hydrocarbon gas, preferably a chemically unsaturated gas, and then blown clear of the gas. The porous layers will absorb and retain a portion of the gas, while the non-porous layers will not. After preimpregnation with the gas, an oxidizing agent may be introduced into the hole. It will oxidize the gas absorbed by the porous layers and the resulting temperature log will indicate these strata. The reaction need not be exothermic, but may be endothermic. Some of the layers may not react but the presence of one or several separated layers containing reactive materials will enable a correlation to be made.

Figures 3, 4:
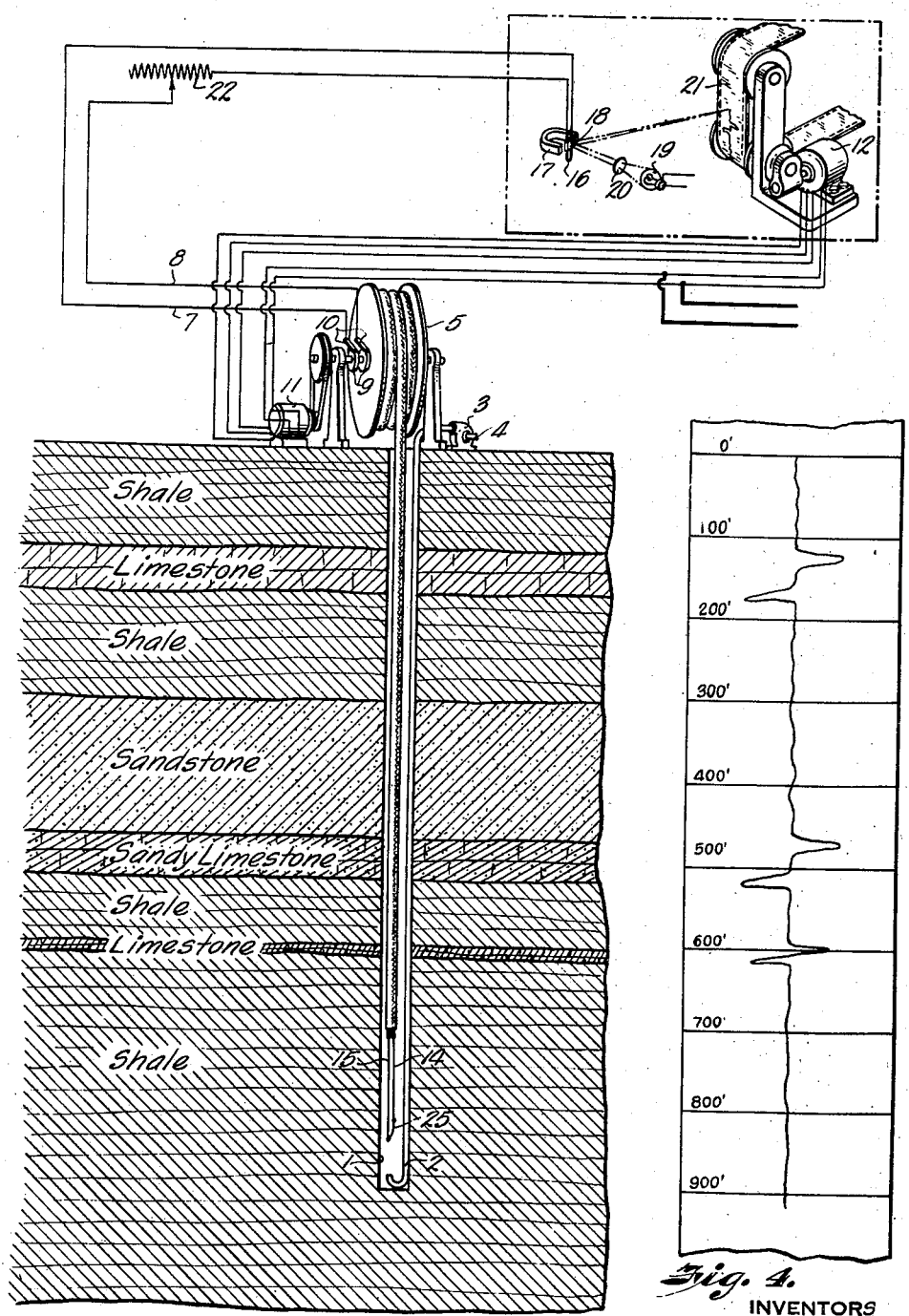
Figure 3 is a diagrammatic view of a drill hole showing apparatus of our invention in the drill hole capable of carrying out another embodiment of the method of our invention.
Figure 4 is a view of a bore hole log taken according to the method shown in Figure 3.

In some instances it may be preferable to log the temperature gradient or difference between two points spaced a predetermined distance apart; as for example the temperature gradient of a 10-foot interval observed throughout the depth of a bore hole. This can be accomplished by inserting in the lower end of conductor 14 or 15 a length of a suitable unlike metal conductor to serve as one link of a thermocouple which will provide a measure of temperature differences between the ends of the inserted unlike metal conductor. This arrangement is shown in Fig. 3. In this arrangement it may be preferable for conductors 14 and 15 to be of the same metal, such as copper, and the inserted unlike length 25 of meter at the lower end of one of the conductors to be a dissimilar metal such as iron or German silver.

It will be observed that we have accomplished the objects of our invention. We have provided a rapid, inexpensive and dependable method of logging and correlating bore holes.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is therefore, to be understood that our invention is not to be limited to the specific details shown and described.

Having thus described our invention, what we claim is:

1. A method of logging bore holes, including the steps of introducing into the bore hole a chemical reactant adapted to react with the material forming the bore hole in a reaction producing a temperature change, measuring the temperature along the bore hole and recording variations in temperature with respect to depth to obtain the desired bore hole log.

2. A method as in claim 1 in which the reactant is an acid.

3. A method of logging bore holes including the steps of introducing a chemical reactant into the bore hole for reaction with the material forming the walls of the bore hole in a reaction producing a temperature change, measuring the temperature gradient within the bore hole between two points spaced a predetermined distance apart while moving said measuring points along the bore hole and recording variations in temperature gradient with respect to depth to obtain the desired bore hole log.

LAWRENCE F. ATHY.
HAROLD R. PRESCOTT.